Patented Feb. 21, 1928.

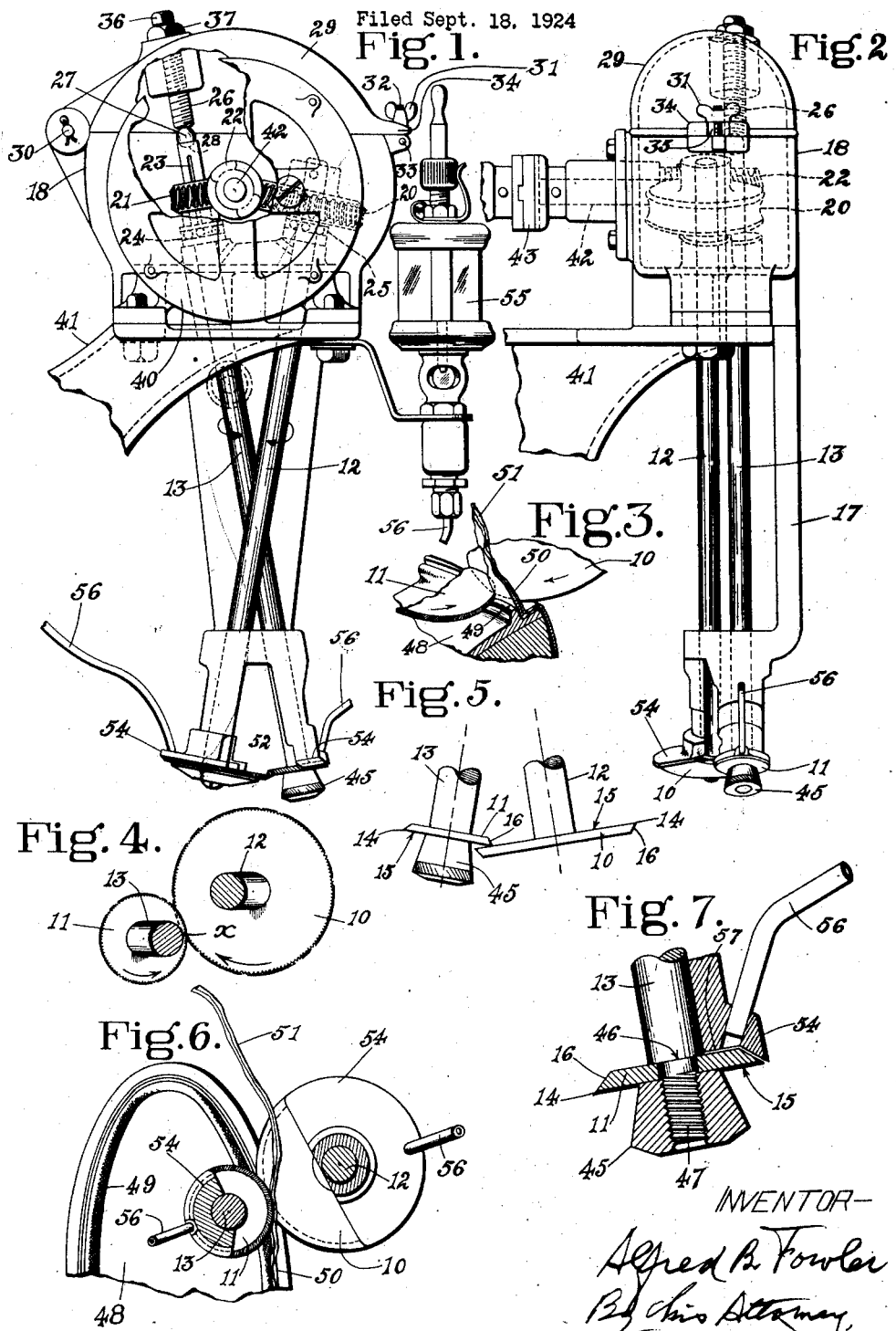

1,659,597

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

TRIMMING MACHINE.

Application filed September 18, 1924, Serial No. 738,434, and in Great Britain June 26, 1924.

This invention relates to trimming machines and more particularly to machines of the type comprising rotary shearing elements. The invention is herein illustrated in a form designed for use in the manufacture of boots and shoes to trim surplus upper material from the bottom of a lasted shoe. Machines for this purpose are commonly called upper-trimming machines and they are used chiefly to trim around the toe where the quantity of surplus material is usually greatest and where, by reason of being crimped in the lasting, it would, if not trimmed, prevent proper functioning of the welt-sewing machine. It is to be understood, however, that various features of the invention are not limited to boot and shoe upper-trimming machines.

Since the invention is herein disclosed in a form designed especially for upper-trimming it will be described in terms relating to that branch of the shoemaking art. This trimming operation has heretofore been performed by a trimming machine comprising a chopping cutter which has the form and motion of a chisel and which requires frequent grinding to maintain its cutting edge sharp enough to do satisfactory work. Incidentally to this operation the cutter commonly encounters not only the usual leather and cloth lining of the upper but also a relatively thick and hard stiffening member called the "toe box". This stiffening member causes rapid dulling of the chopping knife and imposes a relatively great strain that not infrequently springs the knife out of true relatively to the abutment by which the work is braced against the cutting stress, and sometimes causes breakage of one or more of the parts. Moreover, the chopping knife frequently encounters the wire staples which sometimes replace the lasting tacks and sometimes encounters a lasting tack that has been missed by the tack-pulling machine, and is thereby dulled so that the operative is obliged to remove the knife from the machine and resharpen it before he can proceed with the work. The time devoted to resharpening the chopping knife and the expense involved in substituting new parts for those that become broken constitute big items in the maintenance and operating cost of such machines, for unless the cutting edge is kept sharp it produces ragged cuts and tears rather than cuts the materials.

In view of the conditions above explained an object of the present invention is to provide an improved trimming machine adapted to make a clean cut on all the various materials encountered in a boot or shoe without requiring keenness of the shearing edges and without deteriorating in consequence of long periods of use and encountering metallic fasteners. To this end the invention provides a novel machine organization for trimming surplus material from a shoe, for example surplus upper material lying on the bottom of a lasted shoe, which organization comprises two rotary shearing cutters the cutting edges of which are arranged in lapped relation and the axes of which are arranged in skewed relation to restrict the contact of the cutters to a point where the two cutting edges cross each other. The lapped relation of the cutters, particularly when the cutters are skewed to restrict contact with each other as aforesaid, insures a clean cut of all the various kinds of materials encountered in a shoe and does away with the necessity for maintaining the cutting edges in a sharp condition.

As shown, each cutter has a flat face and a frusto-conical face which meet to form a circular, acute cutting edge. The flat faces of the two cutters are arranged in confronting relation and the two frusto-conical faces are preferably roughened, one of the faces thus roughened being effective to feed the severed surplus material while the other is effective to feed the shoe by engagement with the remaining material from which the surplus material is severed. Again, as shown, the acute cutting edges are preferably nicked to render the feeding action more powerful, the nicks in the cutting edges being formed by milling the frusto-conical surfaces and thereby intersecting the cutting edges.

Another object of the invention is to provide improved means for guiding the work relatively to the cutters and for spacing the sole of the lasted shoe from the point of cut to regulate the closeness of trimming. Accordingly a feature of the invention consists in a work gage arranged adjacent to the point where the cutters cooperate with each other, said gage being suitably formed and mounted to engage the insole of the shoe in the angle formed by the bottom of the sole and the inner surface of the stitch-receiving rib or lip. The gage, furthermore, is preferably formed to maintain the material to be trimmed in an upright position, or, if said material is normally inclined toward the middle of the sole, to bend it to an upright position as it approaches the point of cut.

Still another object is to provide improved means to supply a liquid lubricant or solvent to the cutters under such control that it will not drip from them or be thrown off by centrifugal force. A specific instance of the necessity for a liquid arises from the use of a certain type of box-toe stiffener comprising a sticky substance that accumulates on the cutters. In the case mentioned the purpose of the liquid is to dissolve whatever sticky substance would otherwise adhere to the cutters, and thereby enable the cutters to cut more easily and to clean themselves by their wiping action on the materials being trimmed. It is known that kerosene is a suitable lubricant and solvent for the sticky substance referred to.

As to this object a feature of the invention consists in arranging plates in capillary relation to the cutters respectively, and in arranging means to supply a liquid solvent such as kerosene between the members of each capillary couple. The capillary effect prevents the liquid from flowing beyond the area of the capillary relation, and consequently counteracts centrifugal force and prevents dripping. These preventative effects are developed to a satisfactory degree in the illustrated construction by making the plates stationary, since their immovability counteracts the tendency of the liquid to move with the cutters. The plates also distribute the liquid over the cutters, thus insuring a coating sufficient to accomplish the purpose stated.

Other features of the invention are hereinafter described and claimed and are shown by the accompanying drawings.

Referring to the drawings,

Fig. 1 is an elevation of a preferred form of upper-trimming machine embodying the invention, portions thereof being broken away;

Fig. 2 is an elevation of the same structure, viewed from right to left;

Fig. 3 is a perspective view of portions of two cutters in the act of trimming, the article of work being a portion of a lasted shoe;

Fig. 4 is a diagrammatic view of the two cutters alone;

Fig. 5 is an elevation of the cutters;

Fig. 6 is a horizontal section looking down from a plane slightly above the cutters and includes a portion of a lasted shoe undergoing trimming; and Fig. 7 is a vertical section through the smaller of the two cutters.

The cutters are indicated at 10 and 11 and are carried respectively by shafts 12 and 13. Each cutter has an acute-angular cutting edge 14 formed by a flat surface 15 and a frusto-conical surface 16. The surfaces 16 are preferably roughened for the purpose of feeding the work by engaging the confronting surfaces of the severed sections of material formed by the cutting edges, and are shown as milled. The grooves produced by milling intersect the cutting edges and form nicks in the latter in consequence of which the cutting edges are provided with teeth (see Fig. 4) which have a work-feeding action in conjunction with that of the roughened surfaces 16.

The cutters are so arranged that the flat faces 15 lap and confront each other but, instead of being parallel, they occupy angular relation by reason of the fact that their axes are skewed. The shafts 12 and 13 are arranged to cross each other (see Fig. 1), and their lower portions are journaled in bearings formed in a frame 17 while their upper portions are journaled in bearings formed in a gear case 18 of which the frame element 17 is an integral part, although, if desired, the element 17 could be made separately and bolted or otherwise affixed to the gear case.

Inasmuch as the cutter shafts cross each other their axes are skewed, that is, they do not intersect but are offset laterally from each other as shown by Fig. 2. Preferably, though not necessarily, the planes of the axes, from the viewpoint of Fig. 2, are parallel. By arranging the axes in angular relation as shown by Fig. 1, and by offsetting them laterally from each other as shown by Fig. 2, that is, arranging them in nonintersecting relation, it is possible to arrange the cutters so that their cutting edges will cross each other and either touch or nearly touch each other at a single point only, for example, at point $x$ in Fig. 4.

A novel and simple scheme of gearing is provided for rotating the cutter shafts in opposite directions and comprises a worm gear 20 fixed to the shaft 12, a worm gear 21 arranged on the shaft 13, and a driving worm 22 arranged between and engaging the gears 20 and 21. To provide for adjusting the cutter 11 axially the shaft 13 and the worm gear 21 are connected by a spline or feather the groove of which is indicated at 23 in Fig. 1. The shaft 13 is therefore capable of being adjusted axially without altering the relation between the worm gear 21 and the driving worm 22. The gear 21 is supported by a roller thrust bearing 24, and the tendency of the worm is to urge the gear 21 against its thrust bearing. The worm gear 20 and the cutter 10 are both pinned or otherwise fixed to the shaft 12 and the assemblage formed by them is supported by a roller thrust bearing 25.

Since the cutter 11 is arranged to overlie the cutter 10 the work tends to raise it and at the same time tends to force the cutter 10 downwardly. The downward tendency of the cutter 10 is sustained by the thrust bearing 25 but the upward tendency of the cutter 11 is sustained by an adjusting screw 26 which is arranged in coaxial relation to the shaft 13. To minimize friction a hard steel ball 27 is interposed between the adjusting screw and the shaft 13. To maintain the ball in place either the adjusting screw or the shaft, preferably the latter, is provided with a socket 28.

The gear case 18 is adapted to hold oil or grease in which the gears may run, and is preferably made in two sections one of which is a removable cover 29. As shown by Fig. 1, the two sections are connected by a hinge 30 so that the cover may be tipped up and back to give access to the gears. Any suitable means may be provided for locking the cover in closed position, the means shown including a wing nut 31 and a screw 32 connected to the lower section by a pivot pin 33. When the wing nut is tightened it bears down on an ear 34 formed on the cover, said ear having a cleft 35 to receive the shank of the screw.

The adjusting screw 26 extends through and has screw connection with the cover 29 and is accessible outside the cover for purposes of adjustment. The head 36 is adapted to be turned by a wrench so that the adjustment of the cutter 11 may be made while the cover is closed and held by the wing nut 31. A binding nut 37 is applied to the adjusting screw 26 to maintain the adjustment. Even though the adjusting element is carried by the removable cover 29 it will always return to its effective position when the cover is closed after being opened.

The organization includes an electric motor 40 for driving the worm 22. The frame or casing of the motor and the gear case 18 are both bolted to a stand 41. The worm 22 is fixed to a shaft 42 and the latter is journaled in a bearing in the gear case 18. The shaft of the motor and the worm shaft 42 are, to all intents and purposes, coaxial, and are preferably connected by a well-known coupling 43 commonly called an Oldham coupling.

It has been found that for most purposes it is not necessary for the cutters 10 and 11 to touch each other provided their cutting edges are not separated by more than enough space to provide actual clearance, and it has also been found that when they do not touch they do not wear each other and consequently their period of utility is correspondingly greater. Moreover, it has been found that by reason of the novel relation of the cutters with regard especially to the relation of their axes as hereinbefore explained, it is not necessary to maintain the cutting edges in a sharp condition, and that even when they lack that keenness that is usually required of shearing edges and other cutting edges they nevertheless produce a clean cut and in all other respects operate satisfactorily when organized in this relation. Even the nicking of the cutting edges by milling them as hereinbefore stated does not militate against a clean cut. The feeding action of the cutters is particularly effective and, to all intents and purposes, positive when the cutting edges are nicked, and the operative is relieved from all effort and attention excepting that required to present the work to the cutters and guide it.

When the machine is equipped to trim the uppers of pulled-over boots and shoes it may be provided with gaging means to control the course of trimming. I prefer for this purpose a knob 45 of frusto-conical form carried by the shaft 13 and arranged under the cutter 11. According to the construction shown in Fig. 7, the knob serves the additional purpose of fastening the cutter to the shaft, since the latter is turned down to provide a shoulder 46 and is formed with a thread 47 while the knob is bored and tapped to act as a nut. The direction of the thread is such as to develop a tendency to tighten the knob and cutter when the machine is operating.

The lower end of the knob or gage 45 is intended to engage the face of the insole 48 while the tapered periphery engages the inner surface of the upstanding rib or lip 49 with which the insole is provided. Thus the gage maintains the face of the insole a definite distance below the level of the point where the cutting edges cooperate, and in this way limits the closeness of trimming. At the same time the periphery of the gage guides the shoe by its engagement with the rib 49 and assists the operative to guide the materials to be trimmed, that is, the upstanding marginal portions 50 of the upper, toe-stiffener, if the shoe has one, and lining, into the field of trimming. Moreover, the character of the gage 45 is such as to facilitate rapid turning of the shoe while trimming around the toe, and the small size of the gage adapts it particularly to the trimming of shoes that have sharp pointed toes.

Figs. 3 and 6 show the waste material 51 extending across the cutter 10 from the field of trimming. To ensure sufficient space through which this trimmed material may pass without hindering the feeding or other manipulation of the shoe, the bearings in which the lower portions of the cutter shafts are journaled are cut away as shown in Fig. 1. This space is indicated by the numeral 52.

A large proportion of toe stiffeners are made of felt or some equivalent fabricated material and are impregnated with a stiffening compound including asphaltum and other sticky substances that accumulate on the cutters. To avoid hindrance due to such accumulation this invention provides means for supplying a solvent to the cutter. As shown by Figs. 1, 2 and 6, the cutters are covered with guard plates 54 whose primary function is to fend the operative's fingers from contact with the cutting edges by restricting the exposed portions of the cutters as much as possible consistently with the requirements for trimming. If the aforesaid stiffening substance in the toe stiffeners were permitted to accumulate on the cutters it would soon prevent the cutters from functioning properly.

Still, if a suitable solvent, kerosene for example, were supplied to the cutters the latter would be kept free from such accumulations, but this involves the problem of preventing the solvent from soiling the shoes. The illustrated construction includes means for supplying a solvent in such a way and under such control that the surfaces of the cutters may be kept constantly covered with the solvent without supplying it so copiously as to cause it to drip from the cutters or to be thrown from them by centrifugal action. Preferably two separate oil cups 55 are provided, one for each cutter, although, if preferred, a single cup could be used to supply solvent to both cutters. Small feed tubes 56 conduct the solvent to the guard plates 54, the latter being bored from top to bottom as shown in Fig. 7 so that the solvent may run through them. Since it is desirable for mechanical reasons to provide a slight space 57 between the cutters and their respective guard plates, I prefer to utilize these spaces to distribute the solvent over the upper faces of the cutters. Moreover, the capillary action of a space so restricted works to the advantage of the problem at hand in that it retains all surplus solvent which would otherwise flow upon the exposed surfaces of the cutters only to be thrown from the cutters by centrifugal action.

Having thus described my invention, what I claim as new and desire to secure by Letters Patent of the United States is:

1. A trimming machine comprising two crossed shafts having adjacent free ends, means for driving said shafts, and two cutters carried respectively by said ends of said shafts and having circular peripheral cutting edges in lapped, shearing relation, said cutters being arranged to trim surplus material from the bottom of a lasted shoe presented thereto.

2. A trimming machine comprising two crossed shafts, driven gears carried by said shafts respectively, a driving gear between and engaging both of said driven gears, and two cutters carried by said shafts respectively, said cutters having circular edges in cooperative shearing relation.

3. A trimming machine comprising two crossed shafts, a driving worm arranged between said shafts, worm-gears carried by said shafts respectively and arranged to cooperate with said worm, and two cutters carried by said shafts respectively, said cutters having circular edges in cooperative shearing relation.

4. A trimming machine comprising two crossed shafts, two cutters carried by said shafts respectively and having circular edges of unequal diameters in cooperative shearing relation, a driving worm arranged between said shafts, and worm gears carried by said shafts respectively and arranged to cooperate with said worm, the diameter of said worm gears being unequal to counteract the inequality in the diameters of said shearing edges.

5. A trimming machine comprising two shafts each carrying a worm gear and a cutter having a circular cutting edge, said cutters being spaced a substantial distance from the worm gears and said shafts being arranged to cross each other at acute angles between said gears and cutters, and a driving worm arranged between and engaging said gears, said cutting edges being arranged in cooperative cutting relation.

6. A trimming machine comprising two rotary cutters each having a circular acute-angular cutting edge provided with nicks to feed the work, the axes of said cutters being skewed, said cutters being in lapped relation and said edges being in cooperative cutting relation, and means for rotating said cutters to feed and sever the work.

7. A trimming machine comprising two rotary cutters arranged to sever surplus upper material from the bottom of a pulled-over shoe, said cutters having serrate cutting edges arranged in shearing relation and having rough work-feeding surfaces arranged to engage respectively the two confronting surfaces of the severed sections of material formed by said cutting edges, and means for driving both of said cutters to feed both of said sections by said confronting surfaces.

8. A trimming machine comprising two rotary cutters arranged to sever surplus upper material from the bottom of a pulled-over shoe, the axes of said cutters being relatively skewed, said cutters having cutting edges arranged to cross each other in shearing relation and having grooves arranged to feed the shoe by engagement with the two confronting surfaces of the severed sections of material formed by said cutting edges, said grooves intersecting said cutting edges and forming nicks in the latter, and means for driving both of said cutters.

9. A trimming machine comprising a cutter and a plate relatively arranged to retain a liquid between them by capillary action, and means arranged to supply a liquid between them.

10. A trimming machine comprising a movable cutter and a stationary plate formed and arranged to retain a liquid between them by capillary action, and means arranged to supply a liquid between them.

11. A trimming machine comprising a rotary disk cutter and a plate formed and arranged to retain a liquid between them by capillary action, and means arranged to supply a liquid between them.

12. A trimming machine comprising two rotary cutters having cutting edges arranged in shearing relation, means arranged to supply a liquid to said cutters individually, and means arranged in capillary relation to said cutters to distribute the liquid over the surfaces of the cutters and to limit the area in which the liquid may flow.

13. A trimming machine comprising a movable cutter, a guard arranged to cover a substantial area of said cutter and a substantial portion of its cutting edge, the confronting surfaces of said guard and cutter conforming to each other and being arranged in capillary relation, and means arranged to supply a liquid between said confronting surfaces.

14. A trimming machine comprising two rotary cutters each having a flat face, a frusto-conical face and a circular cutting edge formed by said faces, said frusto-conical faces being rough to feed the work, said flat faces being in lapped, confronting relation, the axes of said cutters lying in angular relation, and said edges being in cooperative shearing relation, and means for rotating both of said cutters.

15. A trimming machine comprising two cooperative cutters, means including gears for operating said cutters, a case enclosing said gears, and means for relatively adjusting said cutters, said adjusting means being fastened to said gear-case and accessible outside the latter to effect such relative adjustment.

16. A trimming machine comprising two rotary cutters arranged to cooperate with each other, a longitudinally adjustable shaft to which one of said cutters is fixed, gears for rotating said shaft, a case enclosing said gears, and means for adjusting said shaft longitudinally, said means being fastened to said gear-case and accessible outside the latter to effect such adjustment.

17. A trimming machine comprising two rotary cutters arranged to cooperate with each other, a longitudinally adjustable shaft to which one of said cutters is fixed, gears for rotating said shaft, a case enclosing said gears and one end of said shaft, and means extending through a wall of said gear-case for external manipulation to adjust said shaft endwise.

18. A trimming machine comprising two rotary cutters arranged to cooperate with each other, a longitudinally adjustable shaft to which one of said cutters is fixed, gears for rotating said shaft, a case enclosing said gears and one end of said shaft, and an adjusting screw extending through and having screw connection with a wall of said gear-case and arranged to act against said end of said shaft to adjust the latter endwise.

19. A trimming machine comprising two rotary cutters arranged to cooperate with each other, a longitudinally adjustable shaft to which one of said cutters is fixed, gears for rotating said shaft, a case enclosing said gears and one end of said shaft, an adjusting screw having screw connection with said gear-case, said screw and shaft being coaxial, and a hard steel ball between and engaging the confronting ends of said shaft and said screw, one of said confronting ends having a socket to retain said ball.

20. In a device of the class specified, the combination of a pair of skewed arbors adapted to carry feed and cutting rolls at adjacent ends, bearings therefor, supports for said bearings, gearing connecting the opposite ends of the arbors, and means for revolving them.

In testimony whereof I have signed my name to this specification.

ALFRED B. FOWLER.